(12) United States Patent
Bottou et al.

(10) Patent No.: US 9,104,960 B2
(45) Date of Patent: Aug. 11, 2015

(54) CLICK PREDICTION USING BIN COUNTING

(75) Inventors: Leon Bottou, Kirkland, WA (US); Kumar Chellapilla, Sammamish, WA (US); Patrice Y. Simard, Bellevue, WA (US); David Max Chickering, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 360 days.

(21) Appl. No.: 13/163,857

(22) Filed: Jun. 20, 2011

(65) Prior Publication Data
US 2012/0323677 A1 Dec. 20, 2012

(51) Int. Cl.
G06Q 30/00 (2012.01)
G06N 7/00 (2006.01)
G06Q 30/02 (2012.01)

(52) U.S. Cl.
CPC .............. *G06N 7/005* (2013.01); *G06Q 30/0242* (2013.01)

(58) Field of Classification Search
None
See application file for complete search history.

(56) References Cited

U.S. PATENT DOCUMENTS

| | | | |
|---|---|---|---|
| 7,631,008 B2 | 12/2009 | Carson et al. | |
| 7,680,746 B2 | 3/2010 | Agarwal | |
| 7,827,170 B1 | 11/2010 | Horling et al. | |
| 8,010,081 B1* | 8/2011 | Roskowski | 455/406 |
| 8,150,723 B2* | 4/2012 | Chen et al. | 705/7.29 |
| 2002/0087289 A1* | 7/2002 | Halabieh | 702/181 |
| 2003/0063779 A1* | 4/2003 | Wrigley | 382/116 |
| 2006/0058094 A1* | 3/2006 | Kelley et al. | 463/16 |
| 2006/0106743 A1* | 5/2006 | Horvitz | 706/21 |
| 2006/0293950 A1* | 12/2006 | Meek et al. | 705/14 |
| 2007/0073579 A1* | 3/2007 | Immorlica et al. | 705/14 |
| 2007/0162487 A1* | 7/2007 | Frailey | 707/102 |
| 2007/0257781 A1* | 11/2007 | Denson | 340/425.5 |
| 2008/0279113 A1* | 11/2008 | Kalliola et al. | 370/252 |
| 2009/0006363 A1* | 1/2009 | Canny et al. | 707/5 |
| 2009/0037421 A1* | 2/2009 | Gamble | 707/10 |
| 2009/0132334 A1 | 5/2009 | Wang et al. | |
| 2010/0033318 A1* | 2/2010 | Tampke | 340/531 |
| 2010/0082421 A1 | 4/2010 | Tuladhar et al. | |
| 2010/0114954 A1* | 5/2010 | Sareen et al. | 707/776 |
| 2010/0131496 A1* | 5/2010 | Strehl et al. | 707/722 |
| 2010/0179855 A1* | 7/2010 | Chen et al. | 705/10 |
| 2010/0250335 A1 | 9/2010 | Cetin et al. | |
| 2010/0306161 A1 | 12/2010 | Chen et al. | |
| 2011/0131160 A1* | 6/2011 | Canny et al. | 706/12 |
| 2011/0246286 A1* | 10/2011 | Cetin et al. | 705/14.42 |

(Continued)

OTHER PUBLICATIONS

Hillard, et al., "Improving Ad Relevance in Sponsored Search", In proceedings of the third ACM international conference on Web search and data mining, 2010, 9 Pages.

(Continued)

*Primary Examiner* — Matthew T Sittner
(74) *Attorney, Agent, or Firm* — Joann Dewey; Jim Ross; Micky Minhas (57) ABSTRACT

Methods, systems, and computer-storage media having computer-usable instructions embodied thereon for calculating event probabilities are provided. The event may be a click probability. Event probabilities are calculated using a system optimized for runtime model accuracy with an operable learning algorithm. Bin counting techniques are used to calculate event probabilities based on a count of event occurrences and non-event occurrences. Linear parameters, such and counts of clicks and non-clicks, may also be used in the system to allow for runtime adjustments.

20 Claims, 5 Drawing Sheets

(56) References Cited

U.S. PATENT DOCUMENTS

| | | | |
|---|---|---|---|
| 2011/0264513 A1* | 10/2011 | Ratnaparkhi | 705/14.45 |
| 2012/0022952 A1* | 1/2012 | Cetin et al. | 705/14.73 |
| 2012/0130805 A1* | 5/2012 | On et al. | 705/14.49 |
| 2012/0143672 A1* | 6/2012 | You et al. | 705/14.42 |
| 2013/0197774 A1* | 8/2013 | Denson | 701/99 |

OTHER PUBLICATIONS

Piwowarski, et al., "Predictive User Click Models Based on Click-through History", In proceedings of the sixteenth ACM conference on Conference on information and knowledge management, 2007, 8 Pages.

* cited by examiner

CLICK PREDICTION USING BIN COUNTING

BACKGROUND

Internet searching and browsing has become increasingly common in recent years. Due to the increase in use, many online systems (e.g., search engines) try to predict user behavior in an effort to target a user experience. A few areas where user predictions are increasingly important are advertising, search, online sales, and the like. In advertising, for example, it is beneficial to predict whether a user will select, or "click", an advertisement. Click prediction, or click probability, is difficult to estimate as it requires semantic understanding and processing of very large amounts of data.

Previously, high-capacity models such as high-capacity linear models have been used to predict click probabilities. These high-capacity models include a separate weight for each feature value and train all weights simultaneously. For example, an IP address may receive a weight and an advertisement listing may receive another weight. The weight of the IP address and advertisement listing are added to the model and simultaneously trained. This model has a high capacity but requires a substantial amount of time (e.g., four hours) to retrain the model. This operability challenge requires retraining the entire system in order to change the training data. For example, if an outlier needs to be removed from training data, the entire system must be retrained. As immediate revenues and customer satisfaction are tied to the accuracy of a click predicting model, the system should be predictable, robust, and easy to operate.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to systems, methods, and computer storage media for, among other things, predicting click probabilities. Click probabilities may be calculated using a system optimized for runtime model accuracy with an operable learning algorithm. The system utilizes (1) bin counting to calculate click probability and (2) linear training for runtime adjustments. Linear training, as used herein, refers generally to the linearity of parameters, such as clicks or non-clicks, events or non-event occurrences, with respect to traffic, rather than input parameters.

In additional embodiments, linear training may be utilized for alternate parameters including, but not limited to, financial transactions, social network features such as instant messaging or adding a friend, particle emissions, and the like. Bin counting may provide useful intermediate features for each of the above examples.

BRIEF DESCRIPTION OF THE DRAWINGS

The present invention is illustrated by way of example and not limited in the accompanying figures in which like reference numerals indicate similar elements and in which.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are generally directed to systems, methods, and computer-readable media for, among other things, predicting click probabilities. Click probabilities may be calculated using a system optimized for runtime model accuracy with an operable learning algorithm. The system utilizes (1) bin counting to calculate click probability and (2) linear training for runtime adjustments. Linear training, as used herein, refers generally to the linearity of parameters, such as clicks or non-clicks, with respect to traffic, rather than input parameters.

Accordingly, one embodiment of the present invention is directed to one or more computer storage media storing computer-useable instructions that, when used by one or more computing devices, cause the one or more computing devices to perform a method for calculating an event probability. The method comprises receiving a request to calculate an event probability. Information from the request (e.g., match type identifiers, IP addresses, etc.) is associated with both one or more feature groups and a bin of the one or more feature groups. Counter information from at least one of an event counter or a non-event counter associated with the bin is identified. The event counter and the non-event counter are trained using a linear-training algorithm and the event probability is calculated.

Another embodiment of the present invention is directed to a system for predicting event probabilities. The system comprises a computing device associated with one or more processors and one or more computer-readable storage media, a data store coupled with the computing device, and a predicting engine that identifies a request to calculate a probability for an event, associates information from the request with a bin that includes one or more counters, wherein the one or more counters count one or more parameters of the event, identifies counter information from the one or more counters; and calculates, using the counter information, the probability for the event The event may be a click probability for an advertisement, the probability of a social network activity (e.g., adding a friend in the social network environment), the probability of a stock price increase, and the like.

In yet another embodiment, the present invention is directed to one or more computer storage media storing computer-useable instructions that, when used by one or more computing devices, cause the one or more computing devices to perform a method for calculating a probability. The method comprises identifying a request to calculate a click probability for an advertisement and associating information from the request with a bin that corresponds with the request information. The bin may include both a click counter and a non-click counter. Counter information from at least one of the click counter of the non-click counter is identified and is used to calculate the click probability for the advertisement. A traffic attribute is identified for the click probability. The traffic attribute may be a user characteristic, a time interval, a type of traffic to exclude, or the like. The counter information is updated based on the traffic attribute such that the updated counter information includes only clicks and non-clicks for the specified time interval. An updated click probability is calculated using the updated counter information.

Figure 1:
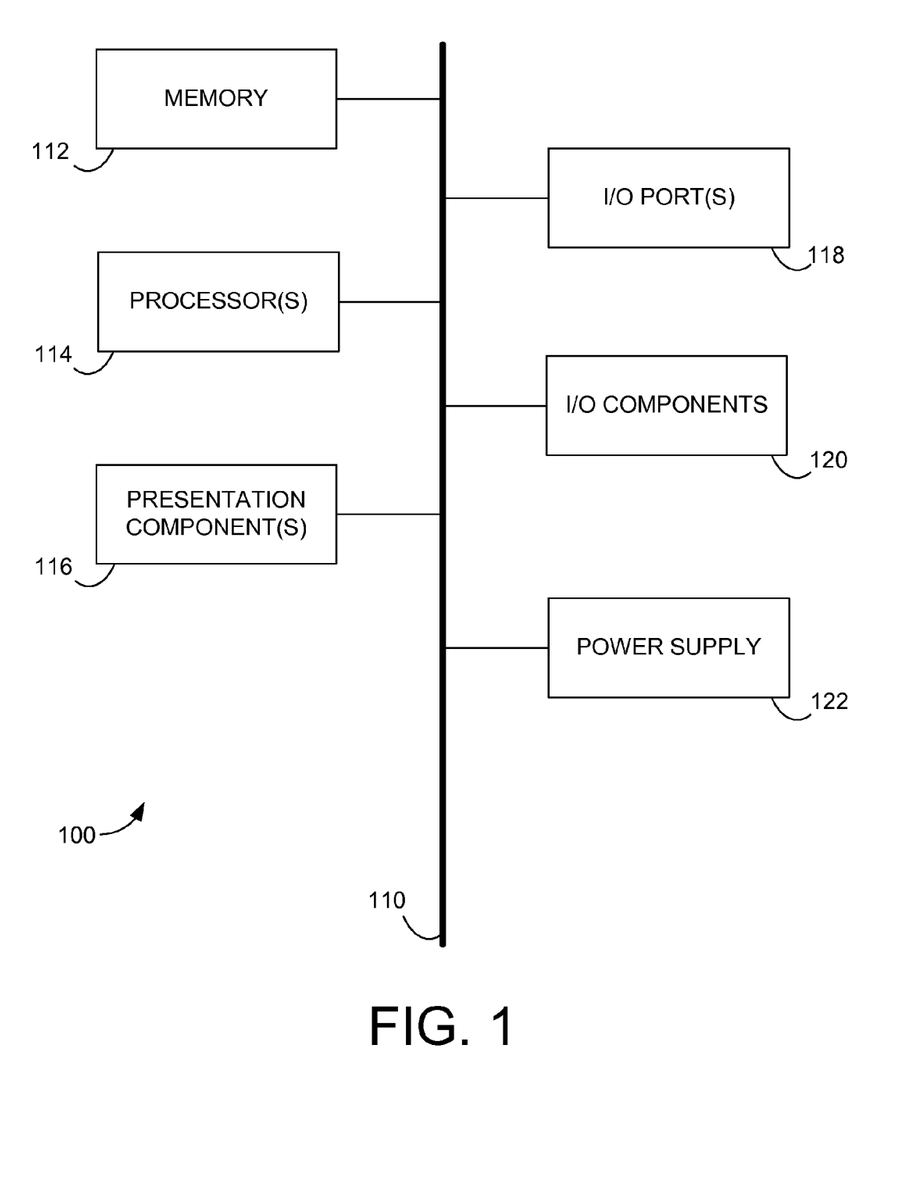
FIG. 1 is a block diagram of an exemplary computing system environment suitable for use in implementing embodiments of the present invention.

Having briefly described an overview of embodiments of the present invention, an exemplary operating environment in which embodiments of the present invention may be implemented is described below in order to provide a general context for various aspects of the present invention. Referring initially to FIG. 1 in particular, a block diagram illustrating an exemplary operating environment for implementing embodiments of the present invention is shown and designated generally as computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one or combination of components illustrated.

Embodiments of the present invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that performs particular tasks or implements particular abstract data types. Embodiments of the invention may be practiced in a variety of system configurations, including hand-held devices, consumer electronics, general-purpose computers, more specialty computing devices, and the like. Embodiments of the invention may also be practiced in distributed computing environments where tasks are performed by remote-processing devices that are linked through a communications network.

With reference to FIG. 1, the computing device 100 includes a bus 110 that directly or indirectly couples the following devices: a memory 112, one or more processors 114, one or more presentation components 116, one or more input/output (I/O) ports 118, one or more I/O components 120, and an illustrative power supply 122. The bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," and the like, as all are contemplated within the scope of FIG. 1 and reference to "computing device."

The computing device 100 typically includes a variety of computer-readable media. Computer-readable media can be any available media capable of being accessed by the computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, etc. The computing device 100 includes one or more processors that read data from various entities such as the memory 112 or the I/O component(s) 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O component(s) 120, some of which may be built in. Illustrative components include a microphone, joystick, game pad, satellite dish, scanner, printer, wireless device, and the like.

Figure 2:
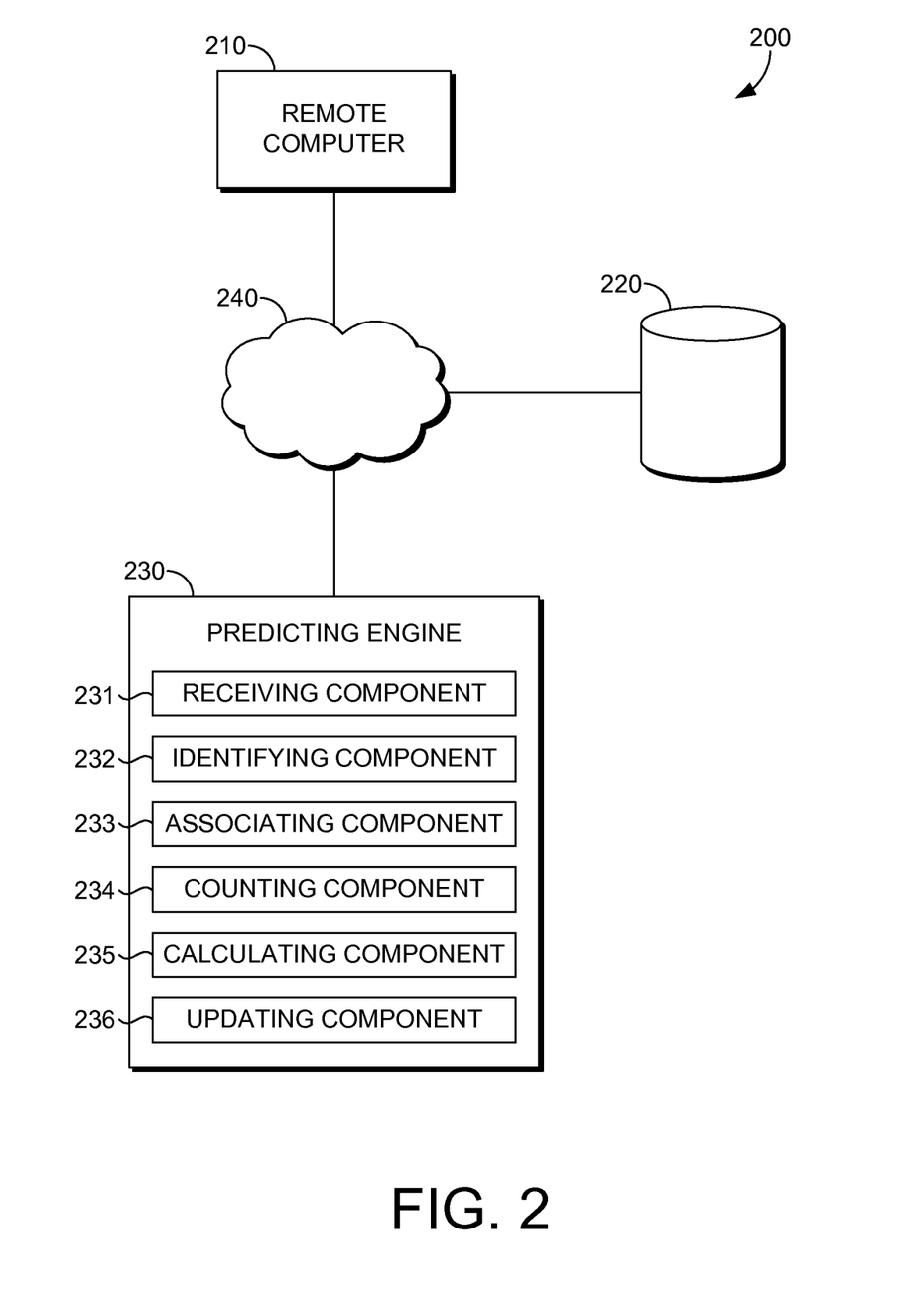
FIG. 2 is a block diagram of an exemplary computing system in which embodiments of the invention may be employed.

As indicated previously, embodiments of the present invention are directed to predicting click probabilities. Turning now to FIG. 2, a block diagram is provided illustrating an exemplary computing system 200 in which embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the computing system 200 generally includes a remote computer 210, a data store 220, a predicting engine 230, and a network 240. The remote computing device 210 may include any type of computing device, such as the computing device 100 described with reference to FIG. 1, for example. The predicting engine 230 may take the form of a dedicated device for performing the functions described below, may be integrated into, e.g., the remote computing device 222, a network access device, or the like, or any combination thereof. The components of the computing system 200 may communicate with each other via the network 240, which may include, without limitation, one or more local area networks (LANs) and/or wide area networks (WANs). Such networking environments are commonplace in offices, enterprise-wide computer networks, intranets and the Internet. It should be understood that any number of personal devices and predicting engines may be employed in the computing system 200 within the scope of embodiments of the present invention. Each may comprise a single device/interface or multiple devices/interfaces cooperating in a distributed environment. For instance, the predicting engine 230 may comprise multiple devices and/or modules arranged in a distributed environment that collectively provide the functionality of the predicting engine 230 described herein. Additionally, other components/modules not shown may also be included within the computing system 200.

In some embodiments, one or more of the illustrated components/modules may be implemented as stand-alone applications. In other embodiments, one or more of the illustrated components/modules may be implemented via the predicting engine 230, as an Internet-based service, or as a module inside a search engine. It will be understood by those of ordinary skill in the art that the components/modules illustrated in FIG. 2 are exemplary in nature and in number and should not be construed as limiting. Any number of components/modules may be employed to achieve the desired functionality within the scope of embodiments hereof. Further, components/modules may be located on any number of servers or client computing devices. By way of example only, the predicting engine 230 might reside on a server, cluster of servers, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components/modules, and in any suitable combination and location. Various functions described herein as being performed by one or more entities may be carried out by hardware, firmware, and/or software. For instance, various functions may be carried out by a processor executing instructions stored in memory.

Generally, the computing system 200 illustrates an environment in which click probabilities may be calculated. As will be described in further detail below, embodiments of the present invention calculate click probabilities in a runtime system using a bin counting technique. Additional embodiments provide for the runtime system to be quickly retrained to focus on a specific traffic attribute without retraining the entire system.

The predicting engine 230 is configured to predict, among other things, click probabilities for, for example, advertisements, query:ad pairs, links, or the like. A click probability, as used herein, refers generally to an expected number of times that a target (e.g., advertisements, links, etc.) will be selected, or clicked, by a user. For instance, it may be desirable to calculate a click probability for an advertisement when presented in combination with a specific search query. In embodiments, the predicting engine 230 predicts probabilities for any event such as, for example, a stock price increase.

The predicting engine 230 includes a receiving component 231, an identifying component 232, an associating component 233, a counting component 234, a calculating component 235, and an updating component 236. Each of the components is configured to enable to the predicting engine 230 to calculate a click probability.

The receiving component 231 is configured to, among other things, receive data related to calculating click probabilities. The data may be a request to calculate a click probability including data related to calculating click probabilities, information necessary to calculate a click probability, or the data may be a search query. In an embodiment, the data necessary to calculate a click probability is received, e.g., by the receiving component 231, from within the request to calculate a click probability such that the information necessary to calculate the click probability is available upon receiving the request. The information included in the request may include, among other things, a query identifier identifying a search query, an advertisement identifier identifying an advertisement, a listing identifier identifying any Internet listing, an internet protocol (IP) address, a match type identifier identifying a match type of a query:ad pair, and the like, or any combination thereof.

A match type, as used herein, refers generally to an identified match between a search query and a bidded keyword. An advertisement, as used herein, refers generally to a text that may be presented in a search-results page. A listing may be associated with the advertisement and may include a cost-per-click bid, a bidded keywords phrase, a match type, and the like. The match type, as previously stated, represents the match between the search query and the bidded keywords.

Exemplary match types are known to those of ordinary skill in the art and may include an exact match (e.g., the bidded keywords match the search query exactly), a phrase match (e.g., the bidded keywords are a sub-phrase of the search query), a smart match (e.g., the bidded keywords are related to the search query), and a broad match (e.g., the individual keywords within the bidded keywords are all contained within the search query).

The identifying component 232 may be configured to identify a request to calculate a click probability. The identifying component 232 is further configured to identify one or more feature groups in which to classify the request information (e.g., the IP address, the match type, etc.). A feature group, as used herein, refers generally to one or more categories with which the data used to calculate a click probability is associated.

Binary features feature) may be used to denote a binary input corresponding to a variable taking on a value. For example, a feature could exist for the event "MatchType=Exact" that is one (1) if the match type is exact and zero (0) if the match type is not exact.

Feature groups may be used to denote a set of dependent features for which exactly one of the features has the value one (1). For instance, the feature group could be defined as "MatchType" to correspond to the set of features including "MatchType=Exact," "MatchType=Phrase," "MatchType=Broad," and "MatchType=Smart." Assuming these features denote the match type of a matched listing, one of the features will have a value of one (1).

Numeric features may be used to denote a numeric input. For example, F2 may be used to denote a number of days an advertiser has been in a system. Each of the feature groups may be converted into numeric features.

Figure 3:
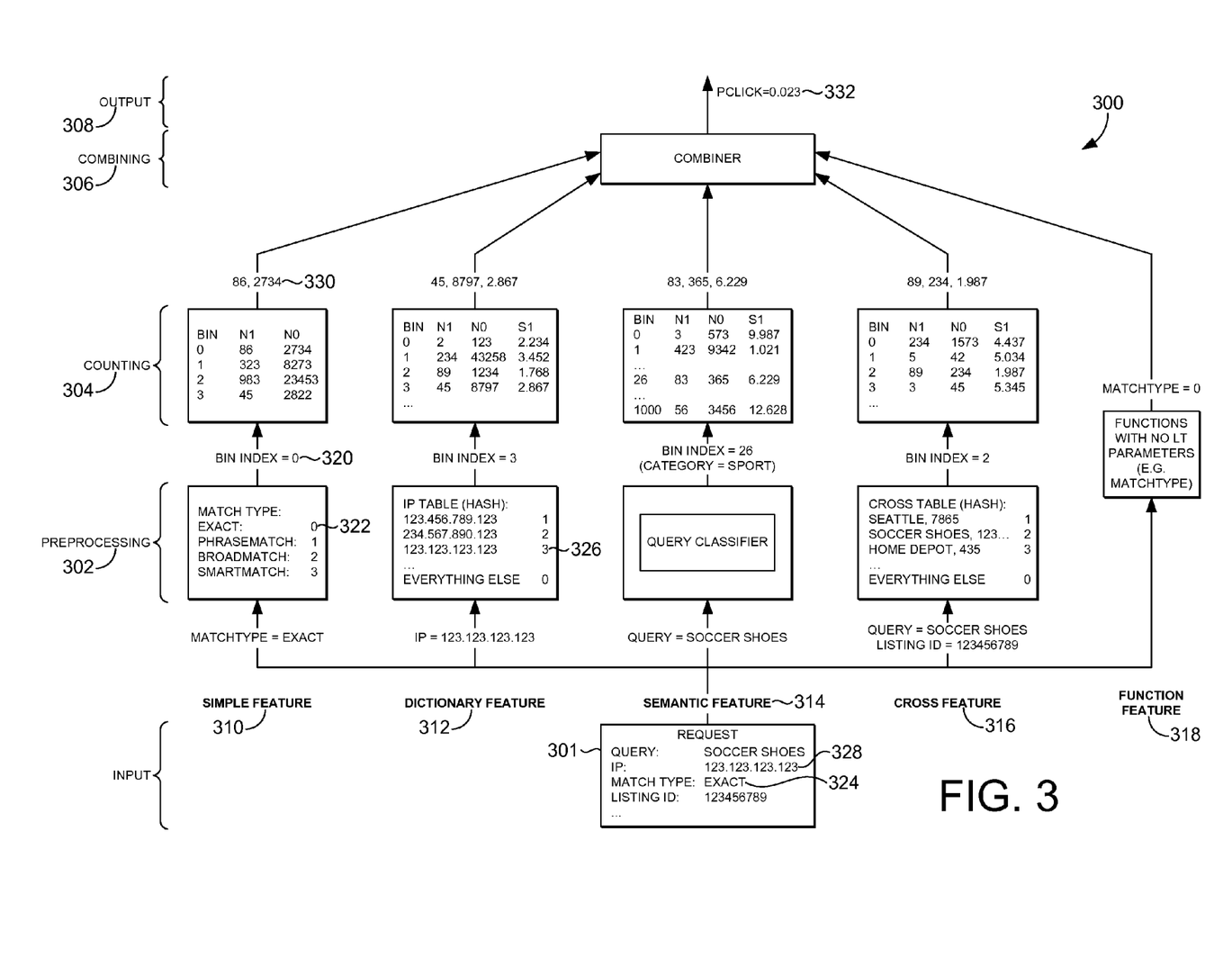
FIG. 3 is a block diagram of an exemplary prediction system in which embodiments of the invention may be employed.

A simple feature group, as used herein, refers generally to a feature group with which match types are classified. For example, assume that the request to calculate a click probability includes match type data indicating an exact match. Match type data may be associated with a simple feature group. Other types of data tracked by a simple feature group include a position of an advertisement (e.g., an advertisement may have a fifth position on a web page), a time of day, a location, a matched keyword length, and the like. The features tracked by the simple feature group are linear trainable, as are any other features that are bin-counted. Each feature group includes one or more bins to associate with the data. For instance, as illustrated in FIG. 3, the simple feature 310 includes four (4) bins: an exact match bin 322 and phrase match, broad match, and smart match bins. The bins are each associated with consecutive integers (i.e., 0 to 3). For instance, the exact match bin 322 is Bin 0. The data to be classified in FIG. 3 includes an exact match type, as illustrated in the request 301 including an exact match type identifier 324. The exact match bin is Bin 0 so the data is associated with Bin 0.

A dictionary feature group, as used herein, refers generally to a feature group for categorizing historical data such as an IP address, advertisers, listing identifiers, query identifiers, user identifiers, and the like. As can be imagined, there is an enormous amount of data that may be tracked by the dictionary feature group. For instance, there are millions of IP addresses. The dictionary feature group may track each IP address received and create a new bin for each address. The dictionary feature group may, alternatively, track common IP addresses that have been received a predetermined number of times. Further, the system could track the most frequently received forty (40) million IP addresses over a fixed period of time. Regardless of how the system tracks the data, the tracked data is organized into one or more bins that may be associated with consecutive integers, as described in detail with respect to the simple feature group. For example, the IP address identifier 328 indicated in the request 301 of FIG. 3 is associated with an IP address bin 526 (i.e., Bin 3) as the IP addresses match.

In an embodiment, a garbage bin may be utilized in each feature group. The garbage bin, as used herein, refers generally to a bin that is associated with both data that has not been previously associated with a bin and data that is not frequently encountered. A determining component (not shown) may determine whether the data has been previously encountered. In other words, whether the data is already associated with a bin. Data that is associated with an existing bin may be associated with the existing bin again. In contrast, data that is not associated with an existing bin is either associated with a newly created bin or the garbage bin.

The garbage bin may be utilized according to a training phase or a testing phase. During the training phase, for each feature, every data value for which linear training parameters exist is associated with a bin. When a data value occurs multiple times, the corresponding bin's counters are updated each time the data value occurs. To limit the number of bins, bins with a low number of occurrences may be merged into the garbage bin. Counts of the garbage bin may be adjusted to reflect the bins it represents. Reducing the size of the model may result in reduced cost and may improve generalization.

During the testing or production phase, for each feature, every data value is identified as corresponding to an existing bin or, if no such bin is present, the data value is associated with the garbage bin. A data value may be associated with the garbage bin in the testing phase if it has never been encountered before (not even in the training phase) or if the occurrence is so rare that it is, during the training phase, merged with other rare values into the garbage bin.

The semantic feature group, as used herein, refers generally to a feature group for extracting semantic meaning from a request. For example, a request could classify whether a search query is one of one thousand (1000) exclusive categories (e.g., shopping-books, shopping-sports, shopping-music, entertainment, geography, etc.). The semantic feature group may be trainable with its own parameters, but the parameters, which are distinct from the counts of each bin, are trained infrequently. If the parameters are retrained, all counts may be recomputed.

The cross feature group, as used herein, refers generally to a feature group that is a product of two or more other features (e.g., a product of a search query identifier and a listing identifier). This is useful as the system may not have enough information to correlate two features together. For instance, the system may identify the probability of a click from an IP address and the probability of a click of a specific listing, but the system may not know the probability of a click of the particular IP address:listing pair. Cross feature groups assist with this problem. Cross feature groups may be sparse because the space of pairs (e.g., triplets) is larger than the space of single features. Also, some bins may have little traffic and end up in the garbage bin.

The function feature group, as used herein, refers generally to a feature group that does not include linear trainable parameters. The function feature group may compute anything from an input (e.g., a request) and make the information available to the system. For example, the function feature may convey real values to the system such as the actual match type, as opposed to historical counts based on the match type, as in the simple feature group.

Once the appropriate feature group is identified, the data may be associated with the feature group by the associating component 233. The associating component 233 may be configured to associate data with one or more feature groups (e.g., associating a match type identifier with a simple feature group). The associating component 233 may be further configured to associate data with a bin of the one of more feature groups (e.g., associating an IP address with a corresponding bin).

The counting component 234 is configured to "count" values for the feature groups. For instance, as described with respect to the simple feature 310 of FIG. 3, the simple feature 310 associates the data (e.g., an exact match identifier) with the exact match bin 322.

The counting component then illustrates a count stage 304 of the bins. As provided in FIG. 3, the exact match bin 322 is associated with count N1 and count N0. The counting component 234 may be configured to count both clicks and non-clicks for a feature group. A click refers to a number of times a target is clicked while a non-click refers to a number of times a target was presented and not clicked. In an embodiment, count N1 represents a number of clicks while count N0 represents a number of non-clicks. As seen in FIG. 3, the exact match bin 322 is associated with 86 clicks and 2734 non-clicks.

The counting component 234 may be further configured to count additional parameters besides clicks and non-clicks. For example, instead of counting clicks, the counting component 234 may count clicks divided by some crude probability estimate (p) for that click. The net effect is that if the probability of a click is low, such as p=0.1, then the new count would effectively be counting 10=1/p clicks. Such weighting may compensate for the fact that some clicks carry more information than others.

Returning to FIG. 2, the calculating component 235 is configured to calculate a click probability. In an embodiment, the calculating component 235 calculates the click probability from the counts received from the counting component 234. The calculating component 234 may calculate a click probability using raw data from the counting component 234. For example, the actual counts for N1 and N0 may be communicated to the calculating component 235. In an embodiment, the counting component 234 feeds the calculating component 235 an estimated probability for each feature using the raw counts as illustrated in the following formula:

$$P=N1/(N1+N0)$$

where P represents an estimated probability, N1 represents a number of clicks, and N0 represents a number of non-clicks. The ratio of N1/(N1+N0) is not linear trainable while the parameters N1 and N0 are linear trainable. If the parameter updates are linear trainable then the overall system is linear trainable. The calculating component 235, which combines the signal from each features, may not be linear trainable as long as it is considered a constant function during the period in which linear trainability is desired.

In additional embodiments, the count data (e.g., N1 and N0) is regularized to avoid problems with low counts. One of skill in the art will appreciate that any regularization method may be used to regularize the count data including feeding a log of both N1 and N0 to the system.

In further embodiments, count data is weighted. The count data may be weighted by probability of clicks such that more relevant clicks are easily identified. For example, assume that a listing that is unlikely to be clicked due to a position of the listing (e.g., the listing is in the fifth position on a web page) is clicked. The click may be weighted differently to get a higher count since it was unlikely to have occurred at all.

The linear trainable property constrains the class of learning algorithms that can be applied to train the parameters in a click-prediction system that are linear trainable. In the previous example of calculating the click probability, simple "counting" parameters are updated by literal addition of counts and used in the click-prediction system. It should be noted that click-prediction systems will leverage a combination of linear trainable and non-linear trainable parameters. In particular, the linear trainable parameters describe herein are meant to capture relationships and concepts that are advantageous to update regularly (e.g., incorporating new data quickly in response to a new "hot" query or by filtering out data from a bot attack). Non-linear trainable parameters are utilized to capture more stable relationships that need only be updated infrequently.

An exemplary runtime model may include the following stages. A first stage may parse raw impression information and produce the features used in the model (e.g., match type, time of day, position, etc.). This stage only needs to be retrained when new features are added to the system. The second stage may include all of the linear trainable parameters and produce intermediate signals based on the input feature values. The parameters in this stage may be updated/re-trained frequently. The third stage (i.e., the combiner stage) produces the final output of the model by combining the intermediate signals from the second stage with any additional features that are "passed through" from the first stage. The first and third stages are designed to generalize most traffic. Typically, they have low capacity and rarely need retraining. Given that the first and third stages are trained (and their parameters fixed), the described model is linear trainable with respect to the parameters of the second stage, resulting in an easy-to-operate and highly responsive system. Linear trainable systems allow the system to be controlled by the traffic it is trained on.

Returning to FIG. 2, the updating component 236 is configured to update count data. The count data may be updated by, for example, adjusting parameters of the system such as traffic attributes. Traffic attributes, as used herein, refer generally to adjustable attributes used to train the system. Specifically, traffic attributes may represent features of web traffic. For instance, traffic attributes include traffic related to a specific time interval such as a year, a quarter, a day, a week, a month, etc., or a user characteristic such as a gender of a user, a location of the user, a user profile associated with the user, or a combination thereof.

The specific time intervals may be referred to as "time slices" such that a specific time slice may be applied to the system. By way of example only, assume that the system needs to predict click behavior for a Monday. The traffic of the last 50 Mondays, for example, may be used to predict the behavior such that all other traffic (e.g., Tuesdays, Saturdays, etc.) is removed from the calculation. Additionally, training parameters may be pre-computed for every minute of traffic. Time slices may then be aggregated in minutes up to a year level, for example. This hierarchical representation allows the system to train for all traffic between time T1 and time T2 by summing the slices within the specific time period. Using this training linearity, the system could train 200 million parameters over an arbitrary time interval in under a minute. This is because n1 and n0 may be compressed to about a byte and 100 MB can be read from a disk in about one (1) second using today's hardware. If time slices are pre-computed for every 1, 2, 4, 8, 16, . . . minutes, then any time period that fits into one (1) year may be computed by adding less than forty (40) slices. With traffic linearity, the training time is proportional to the number of precomputed slices, not the size of the traffic data or the duration of the time interval.

As an additional example, bots (e.g., web crawlers) and other non-billable traffic may be identified and removed to avoid corrupting a click prediction calculation of billable clicks. Traffic may be further sliced by match type, IP addresses, listings, advertisers, and the like. Traffic may also be added or subtracted such that traffic can be considered minus bot traffic, to exclude a match type, and the like.

The updating component 236 may be further configured to focus the click probability calculation on specific traffic attributes such that the entire system is not retrained. Rather, the system receives the input of trainable variables, i.e., traffic attributes, and calculates a click probability using the new traffic attributes such that the system is trained for the newly input traffic attributes in seconds. Additionally, the traffic attributes may be adjusted at any time.

In application, utilizing an exemplary system 300 illustrated in FIG. 3, a request 301 is received that includes data relating to calculating a click probability. The request 301 includes, among other things, a match type identifier 324 and an IP address identifier 328. Also included in the request are a query identifier and a listing identifier that identify the search query and the listing, respectively. The request being received is referred to as the "input" stage of the calculating process. The input stage of the process parses the raw impression data and produces the feature groups used in the system. The input stage is followed by a preprocessing stage 502, a counting stage 304, a combining stage 306, and the output 308.

In this case, the feature groups generated based on the request are the simple feature 310, the dictionary feature 312, the semantic feature 314, the cross feature 316, and the function feature 318. The preprocessing stage 502 associates the data from the request 301 with the appropriate feature group. As previously explained, the match type identifier 324 is associated with the simple feature 310 while the IP address identifier 328 is associated with the dictionary feature 312. The preprocessing stage 302 also associates the data with a corresponding bin. As previously mentioned, the match type identifier 324 indicates that the query:ad pair is an exact match so the exact match bin 322 (i.e., Bin 0) corresponds with the match type identifier 324. Similarly, the IP address bin 326 corresponds with the IP address identifier 328 so the two are associated with one another.

Once the data is associated with a corresponding bin, the bin counts are received. Each bin includes at least a click counter and a non-click counter. Each bin of a feature group includes the same number of counters. Since only one bin is active for a given request, the feature group output is the same size. As illustrated in the counting stage 304, the count data for the exact match bin 322 is 86 clicks and 2734 non-clicks (represented by reference numeral 330) while the count data for the IP address bin 328 is 45 clicks and 8797 non-clicks.

The IP address bin 328 further includes a probability count represented as S1. The probability count may be trained offline and is a constant function that returns a probability (p). The probability is returned by updating the counts for S1 by summing 1/p when there is a click rather than simply adding a click to N1.

The output of the feature groups (i.e., counts) is communicated to a combiner and all of the outputs are combined in the combining stage 306. The combiner may be trained online or offline. The combiner may be trained offline using the output of each feature group as input. The combiner may not be linear trainable and can compute a complex function of the linear trainable parameters (e.g., N1, N0, etc.). The combiner does not require frequent retraining. In embodiments, multiple combiners are used for different kinds of traffic (e.g., pre and post bot filtering), different signals (e.g., probability of being fraud, probability of conversion, etc.), or different metrics such as, for example, log loss, means square error, relative click probability, and the like. Log loss may compute a probability ($p_i$) for a pattern (i) using the following equation:

Log Loss=$1/N \Sigma y_i \ln p_i + (1-y_i) \ln(1-p_i)$ where $y_i$ is a label for the pattern (i.e., 1 if there was a click and 0 otherwise) and $p_i$ is the probability of a click computed by the system.

Relative Information Gain (RIG) may also be used as a metric. RIG is defined as:

RIG=Log Loss−Log Loss$_{CTR}$/Log Loss$_{CTR}$ where CTR is $\Sigma_i y_i/N$. Assuming Log Loss$_{CTR}$ is constant, RIG is simply a linear transformation of Log Loss.

Returning to FIG. 3, the combiner combines the output of the feature groups and provides a probability output 332 in the output stage 308. As previously discussed, the combiner may calculate the probability output 332 using the raw data from the feature groups or the data from the feature groups may be regularized.

In an embodiment, the feature group outputs are fed to a linear classifier and a two-layer NN classifier (i.e., 20 hidden units). The following table illustrates the results:

TABLE 1

| Linear Classifier and 2-Layer NN Classifier | | | |
|---|---|---|---|
| Input Representation | # of Inputs | Linear NN | 2-Layer NN |
| $n_1/(n_1 + n_0)$ | 19 | 24.4% | 27.9% |
| $\log n_1, \log n_0$ | 38 | 27.9% | 28.3% |
| $\log n_1, \log (n_1 + n_0)$ | 38 | 27.9% | 28.2% |
| $\log n_1, \log n_0, \log (n_1 + n_0)$ | 57 | 27.9% | 28.2% |

If the probability estimate of each feature group is fed to a linear classifier having twenty weights, the RIG gain is 24.4%. A two-layer NN achieves 27.9%, which is significantly better. A simple transformation of the input (i.e., log n1, log n0) allows the linear classification (with 39 weights) to reach the same level of accuracy as the two-layer classifier.

The combiner that combines the various data from counting scores can compute an arbitrary function. Probability values may be picked at random. For instance, a linear combiner could compute a probability using logistic regression as follows:

where f is $f(x)=1/(1+e^{-x})$, the parameters T, $w_{i,1}$ and $w_{i,0}$ are trainable, and the positive constants $r_1$ and $r_0$ are regularizers that prevent the Log from taking large values when the counts are small (Log(0)=infinity). One of ordinary skill in the art may recognize that other machine learning algorithms may be used instead of a linear network in the context above.

Figure 4:
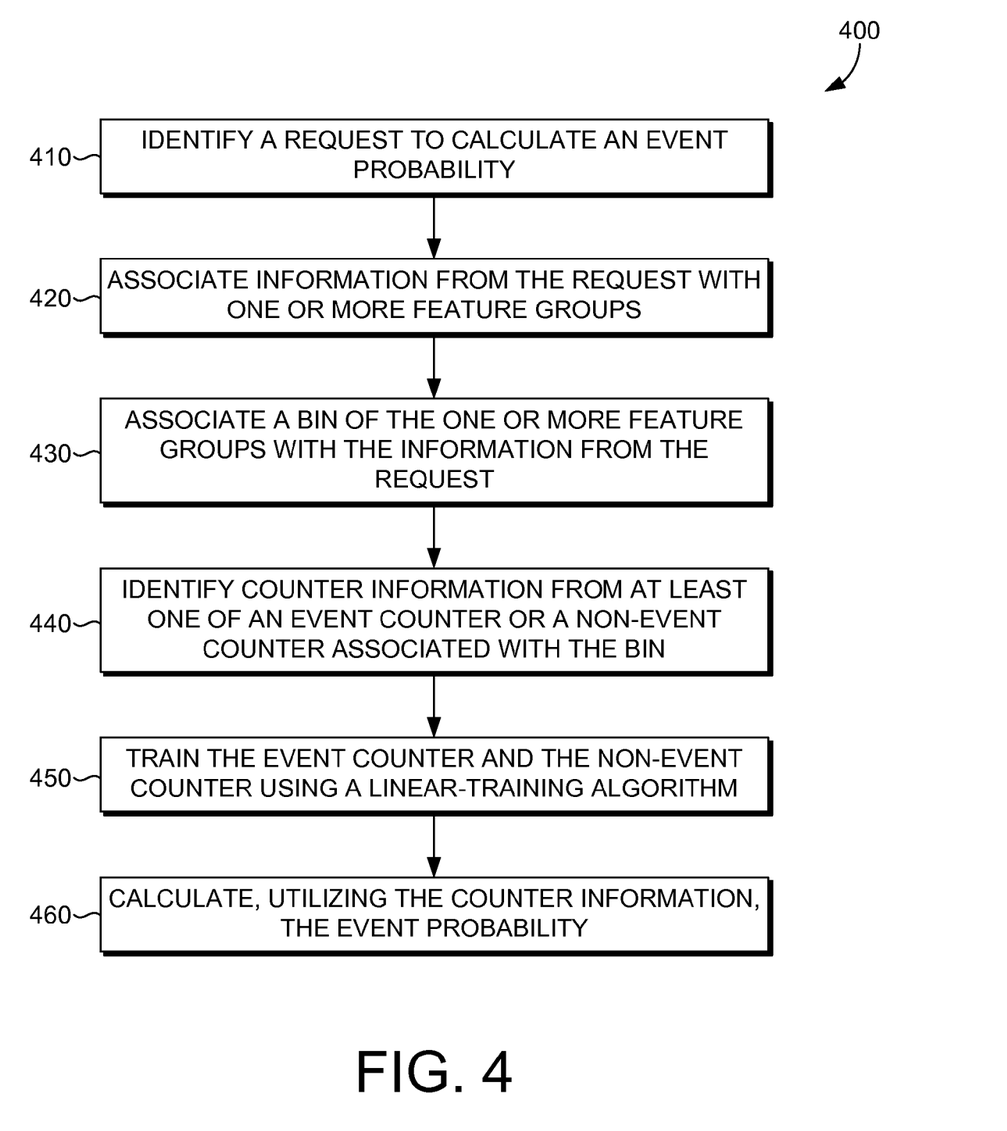
FIG. 4 is a flow diagram showing a first exemplary method 400 for calculating a probability, in accordance with an embodiment of the present invention.

Turning now to FIG. 4, a flow diagram is provided that illustrates a first exemplary method 400 for calculating a probability, in accordance with an embodiment of the present invention. Initially, at block 410, a request to calculate an event probability is received. At block 420, information from the request (e.g., match type identifiers, IP addresses, etc.) is associated with one or more feature groups. At block 430, a bin of the one or more feature groups is associated with the information from the request. Counter information from at least one of an event counter or a non-event counter associated with the bin is identified at block 440. At block 450, the event counter and the non-event counter are trained using a linear-training algorithm. At block 450, the event probability is calculated.

Figure 5:
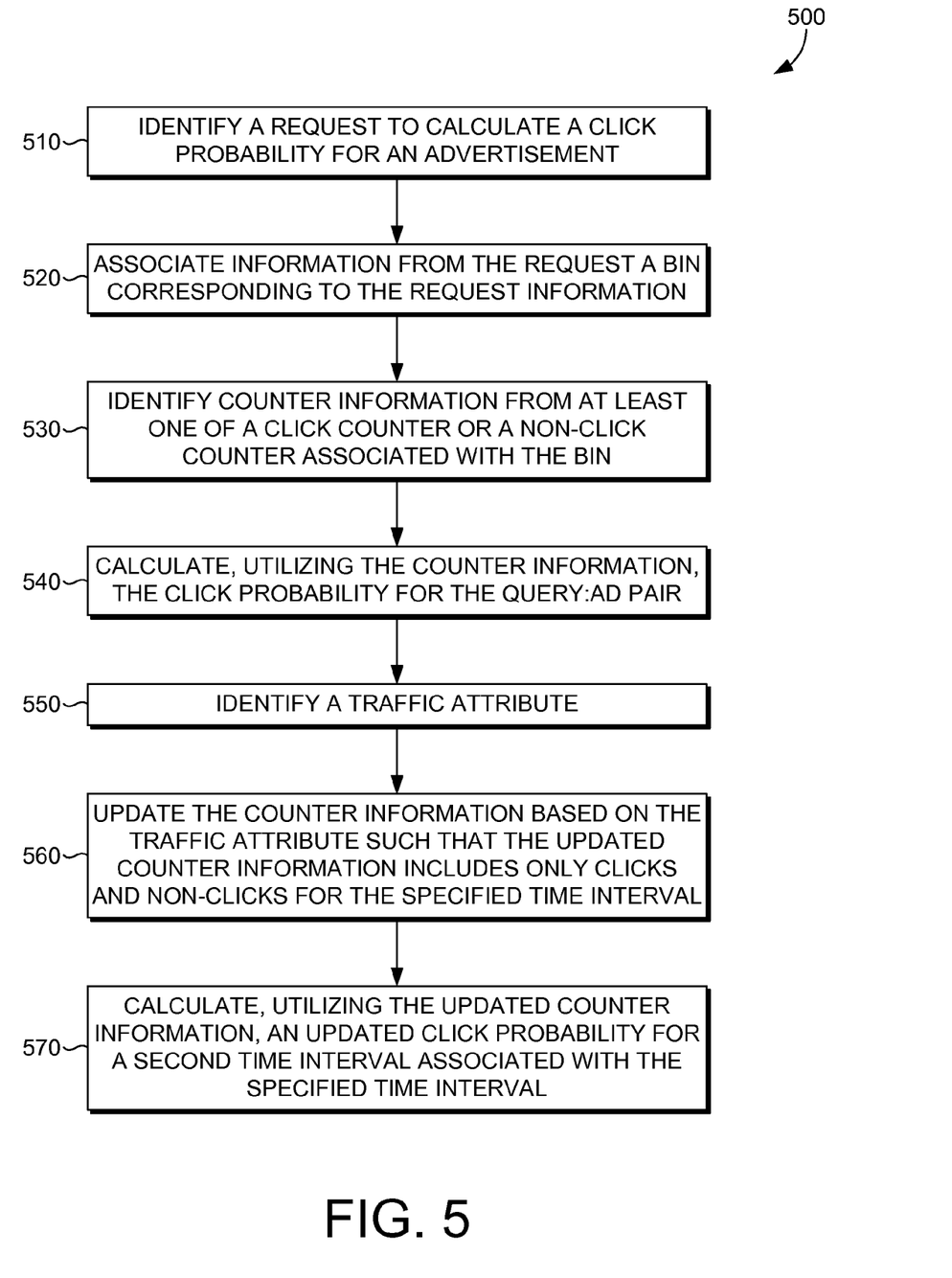
FIG. 5 is a flow diagram showing a second exemplary method 500 for calculating a probability, in accordance with an embodiment of the present invention.

With reference to FIG. 5, a flow diagram is provided that illustrates a second exemplary method 500 for calculating a probability, in accordance with an embodiment of the present invention. Initially, at block 510, a request to calculate a click probability for an advertisement is identified. At block 520, information from the request is associated with a bin that corresponds with the request information, where the bin includes both a click counter and a non-click counter. Counter information from at least one of the click counter of the non-click counter is identified at block 530 and is used to calculate, at block 540, the click probability for the advertisement. At block 550, a traffic attribute is identified for the click probability. The traffic attribute may be a user characteristic, a time interval, a type of traffic to exclude, or the like. The counter information is updated based on the traffic attribute at block 560 such that the updated counter information includes only clicks and non-clicks for the specified time interval. An updated click probability is calculated at block 570 using the updated counter information.

The present invention has been described in relation to particular embodiments, which are intended in all respects to be illustrative rather than restrictive. Alternative embodiments will become apparent to those of ordinary skill in the art to which the present invention pertains without departing from its scope.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

It will be understood by those of ordinary skill in the art that the order of steps shown in the method 400 of FIG. 4 and method 500 of FIG. 5 are not meant to limit the scope of the present invention in any way and, in fact, the steps may occur in a variety of different sequences within embodiments hereof. Any and all such variations, and any combination thereof, are contemplated to be within the scope of embodiments of the present invention.

What is claimed is:

1. One or more computer storage media devices storing computer-useable instructions that, when used by one or more computing devices cause the one or more computing devices to perform a method for calculating event probabilities using linear trainable parameters that capture relationships and concepts that are regularly updatable for a quick incorporation of new data, the method comprising:
   identifying a request to calculate an event probability, wherein the event probability indicates an expected number of times the event will occur;
   associating information from the request with a set of feature groups, wherein the set of feature groups comprises a first subset of feature groups comprising linear trainable parameters characterized by consecutive integers, and a second subset of feature groups comprising non-linear trainable parameters, wherein a feature group is a classification of the information from the request, and wherein each of the first subset of feature groups includes a plurality of bins;
   associating a bin of the plurality of bins with the information from the request;
   identifying, by the one or more computing devices, counter information from at least an event counter and a non-event counter associated with the bin, wherein the event counter counts a number of event occurrences for the request and the non-event counter counts a number of non-event occurrences for the request;
   training, by the one or more computing devices, the event counter and the non-event counter using a linear-training algorithm;
   calculating, utilizing the counter information, the event probability;
   identifying and removing at least one non-billable traffic attribute;
   updating the counter information based on the removal of the at least one non-billable traffic attribute; and
   calculating, utilizing the updated counter information less the non-billable traffic, an updated event probability.

2. The one or more computer storage media devices of claim 1, wherein the event is a click probability.

3. The one or more computer storage media devices of claim 2, wherein the information from the request comprises one or more of a query identifier identifying the query, an advertisement identifier identifying the advertisement, an internet protocol address, and a match type, wherein the match type indicates that the query:ad pair is one of an exact match, a phrase match, a broad match, or a smart match.

4. The one or more computer storage media devices of claim 1, wherein each feature group in the first subset of feature groups is one of a simple feature, a dictionary feature, a semantic feature, or a cross feature.

5. The one or more computer storage media devices of claim 4, wherein at least one feature group in the second subset of feature groups is a function feature, wherein the function feature does not include linear trainable parameters.

6. The one or more computer storage media devices of claim 1, wherein associating the bin with the information from the request includes:
   determining whether the information from the request has been previously identified, wherein the information from the request has been previously identified if it is associated with an existing bin;
   based on a determination that the information from the request has been previously identified, associating the information from the request with the existing bin.

7. The one or more computer storage media devices of claim 1, wherein associating the bin with the information from the request includes:
   determining whether information from the request has been previously identified, wherein the information from the request has been previously identified if it is associated with an existing bin; and
   based on a determination that the information from the request has not been previously identified, associating the information from the request with one of a new bin or a garbage bin.

8. The one or more computer storage media devices of claim 1, further comprising assigning a weight to the counter information.

9. The one or more computer storage media devices of claim 1, wherein the event counter is a click counter that counts a number of clicks of an advertisement and wherein the non-event counter is a non-click counts that counts a number of times the advertisement is presented that does not result in a click of the advertisement.

10. The one or more computer storage media devices of claim 1, wherein the counter information used to calculate the event probability is one of raw counts indicating event occurrences and non-event occurrences or regularized counter information, wherein regularized counter information includes a log of each of the event occurrence counts and non-event occurrence counts.

11. A method for calculating event probabilities using linear trainable parameters that capture relationships and concepts that are regularly updatable for a quick incorporation of new data, the method comprising:
   identifying a request to calculate an event probability, wherein the event probability indicates an expected number of times the event will occur;
   associating information from the request with a set of feature groups, wherein the set of feature groups comprises a first subset of feature groups comprising linear trainable parameters characterized by consecutive integers, and a second subset of feature groups comprising non-linear trainable parameters, wherein a feature group is a classification of the information from the request, and wherein each of the first subset of feature groups includes a plurality of bins;
   associating a bin of the plurality of bins with the information from the request;
   identifying, by the one or more computing devices, counter information from at least an event counter and a non-event counter associated with the bin, wherein the event counter counts a number of event occurrences for the request and the non-event counter counts a number of non-event occurrences for the request;
   training, by the one or more computing devices, the event counter and the non-event counter using a linear-training algorithm;
   calculating, utilizing the counter information, the event probability;
   identifying and removing at least one non-billable traffic attribute;
   updating the counter information based on the removal of the at least one non-billable traffic attribute; and
   calculating, utilizing the updated counter information less the non-billable traffic, an updated event probability.

12. The method of claim 11, wherein the event is a click probability.

13. The method of claim 12, wherein the information from the request comprises one or more of a query identifier identifying the query, an advertisement identifier identifying the advertisement, an internet protocol address, and a match type, wherein the match type indicates that the query:ad pair is one of an exact match, a phrase match, a broad match, or a smart match.

14. The method of claim 11, wherein each feature group in the first subset of feature groups is one of a simple feature, a dictionary feature, a semantic feature, or a cross feature.

15. The method of claim 14, wherein at least one feature group in the second subset of feature groups is a function feature, wherein the function feature does not include linear trainable parameters.

16. The method of claim 11, wherein associating the bin with the information from the request includes:
   determining whether the information from the request has been previously identified, wherein the information from the request has been previously identified if it is associated with an existing bin;
   based on a determination that the information from the request has been previously identified, associating the information from the request with the existing bin.

17. The method of claim 11, wherein associating the bin with the information from the request includes:
   determining whether information from the request has been previously identified, wherein the information from the request has been previously identified if it is associated with an existing bin; and
   based on a determination that the information from the request has not been previously identified, associating the information from the request with one of a new bin or a garbage bin.

18. The method of claim 11, further comprising assigning a weight to the counter information.

19. The method of claim 11, wherein the event counter is a click counter that counts a number of clicks of an advertisement and wherein the non-event counter is a non-click counts that counts a number of times the advertisement is presented that does not result in a click of the advertisement.

20. A computer system for calculating event probabilities using linear trainable parameters that capture relationships and concepts that are regularly updatable for a quick incorporation of new data, the system comprising:
   a computing device associated with one or more processors and one or more computer storage media;
   a data store coupled with the computing device; and
   a predicting engine that identifies a request to calculate an event probability, wherein the event probability indicates an expected number of times the event will occur;
   (1) associates information from the request with a set of feature groups, wherein the set of feature groups comprises a first subset of feature groups comprising linear trainable parameters characterized by consecutive integers, and a second subset of feature groups comprising non-linear trainable parameters, wherein a feature group is a classification of the information from the request, and wherein each of the first subset of feature groups includes a plurality of bins;
   (2) associates a bin of the plurality of bins with the information from the request;
   (3) identifies, by the one or more computing devices, counter information from at least an event counter and a non-event counter associated with the bin, wherein the event counter counts a number of event occurrences for the request and the non-event counter counts a number of non-event occurrences for the request;
   (4) trains, by the one or more computing devices, the event counter and the non-event counter using a linear-training algorithm;
   (5) calculates, utilizing the counter information, the event probability;
   (6) identifies and removes at least one non-billable traffic attribute;
   (7) updates the counter information based on the removal of the at least one non-billable traffic attribute; and
   (8) calculates, utilizing the updated counter information less the non-billable traffic, an updated event probability.

* * * * *